United States Patent [19]
Gallup et al.

[11] Patent Number: 5,290,339
[45] Date of Patent: Mar. 1, 1994

[54] PLATINUM RECOVERY

[75] Inventors: Darrell L. Gallup; G. Todd Ririe, both of Chino Hills, Calif.

[73] Assignee: Union Oil Company of California, Los Angeles, Calif.

[21] Appl. No.: 991,949

[22] Filed: Dec. 17, 1992

[51] Int. Cl.$^5$ ............................................. C22B 11/08
[52] U.S. Cl. ......................................... 75/712; 75/711; 75/744
[58] Field of Search .................... 75/712, 744, 711

[56] References Cited

U.S. PATENT DOCUMENTS

| | | | |
|---|---|---|---|
| 3,394,064 | 7/1968 | Fowkes et al. | 204/150 |
| 3,476,663 | 11/1969 | Norris | 204/151 |
| 3,606,290 | 9/1971 | Ransom | 266/22 |
| 3,686,092 | 8/1972 | Stehlin | 204/197 |
| 3,744,995 | 7/1973 | MacKay | 75/109 |
| 3,792,845 | 2/1974 | Larson et al. | 266/22 |
| 3,840,217 | 10/1974 | MacKay | 266/22 |
| 3,928,155 | 12/1975 | Woodhouse | 204/150 |
| 4,033,763 | 7/1977 | Markels, Jr. | 75/97 R |
| 4,039,407 | 8/1977 | Kelleher | 204/109 |
| 4,119,303 | 10/1978 | Kellerwessel et al. | 266/92 |
| 4,127,989 | 12/1978 | Mickelson | 60/641 |
| 4,273,631 | 6/1981 | Layton et al. | 204/109 |
| 4,280,884 | 7/1981 | Babb et al. | 204/109 |
| 4,331,473 | 5/1982 | King, Jr. | 266/170 |
| 4,429,535 | 2/1984 | Featherstone | 60/641.5 |
| 4,441,697 | 4/1984 | Peterson et al. | 266/170 |
| 4,494,986 | 1/1985 | Forsman | 204/109 |
| 4,602,820 | 7/1986 | Hard | 299/5 |
| 4,606,766 | 8/1986 | Genik-Sas-Berezwosky | 75/744 |
| 4,728,438 | 3/1988 | Featherstone et al. | 210/713 |
| 4,756,888 | 7/1988 | Gallup et al. | 423/42 |
| 4,967,559 | 11/1990 | Johnston | 60/641.2 |
| 5,019,162 | 5/1991 | Suzuki | 75/744 |
| 5,082,492 | 1/1992 | Gallup et al. | 75/712 |
| 5,145,515 | 9/1992 | Gallup et al. | 75/712 |

OTHER PUBLICATIONS

*Chemical Abstracts*, vol. 108, No. 14, Apr. 1988, Columbus, Ohio, US; abstract No. 117603p, p. 334 & JP-A-62 278 164 (Sumitomo Special Metals).

*J. Materials Science*, vol. 27, No. 20, Oct. 15, 1992, London, GB, pp. 5597-5602, R. Chaim, "Pressureless sintered ATZ and ZTA ceramic composites".

Hiskey et al., Gold '90, Proceedings of the Gold '90 Symposium, Salt Lake City, Utah, Feb. 26 to Mar. 1, 1990, Hausen et al. Editors, Society for Mining, Metallurgy, and Exploration, Inc., Littleton, Colo. (1990), pp. 369-376.

*Handbook of Chemistry and Physics*, 65th Edition, Weast, Editor, CRC Press, Cleveland, Ohio 1984, pp. D-155 to D-159.

"Extraction of Gold and Silver from Geothermal Fluid" by Brown et al., at pp. 161-163 of Proceedings of 10th New Zealand Workshop, 1988, GRC.

"Sulfide Precipitation of Heavy Metals from High Salinity Geothermal Brine" by Bartlett et al., at pp. 39-42 of "Transactions", vol. 3, Sep. 1979, GRC.

Primary Examiner—Peter D. Rosenberg
Attorney, Agent, or Firm—Gregory F. Wirzbicki; Shlomo R. Frieman

[57] ABSTRACT

Geothermal brine and other platinum-containing solutions are passed through a carbon-containing zone to recover platinum from the aqueous medium.

22 Claims, 1 Drawing Sheet

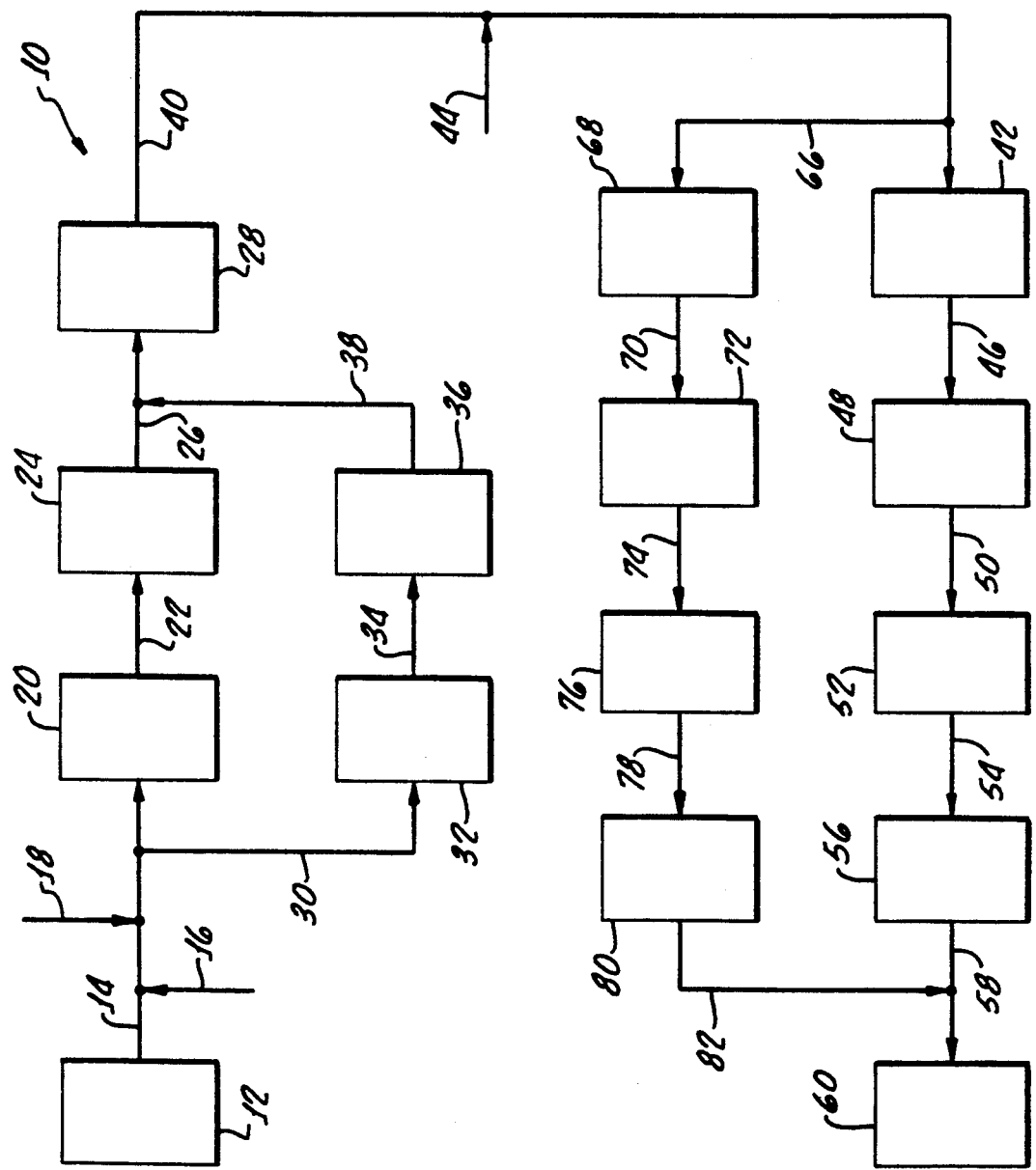

PLATINUM RECOVERY

BACKGROUND

The present invention relates to a process and a system for treating brine and other aqueous solutions to remove platinum.

Systems and processes for recovering various metals from geothermal brine are known. See, for example, U.S. Pat. No. 5,082,492, U.S. Pat. No. 5,145,515, and U.S. Pat. No. 5,145,656, the foregoing patents being incorporated herein in their entireties by reference. However, the recovery of platinum from geothermal brines using known techniques is low. Accordingly, there is a need to increase the percentage of platinum recovered from geothermal brines.

SUMMARY OF THE INVENTION

The percentage of platinum recovered from geothermal brine is increased using the processes and systems of the present invention. In one version of the invention, platinum is recovered by contacting a geothermal brine with carbon, the geothermal brine generally being at an elevated temperature and pressure and having a pH less than about 5.5. In another version of the invention, at least one additional metal is also removed from the geothermal brine. The additional metal, which is selected from the group consisting of copper and metals below copper in the electromotive series (e.g., gold, palladium, and silver), is removed by further contacting the brine with at least one metal above copper in the electromotive series (e.g., iron, zinc, aluminum, nickel, cobalt, cadmium, lead, titanium, and alloys containing at least one of the forgoing metals (such as steel)).

A system embodying features of the present invention comprises (a) a zone for contacting the platinum-containing aqueous solution with carbon; (b) carbon particles, the carbon particles being present in the carbon-contacting zone; and (c) a conduit for transporting the aqueous solution to the carbon-contacting zone.

DRAWING

The removal of platinum and other valuable metals using the processes and systems of the present invention as well as other features, aspects, and advantages will become better understood with reference to the following description, appended claims, and accompanying drawing where the sole FIGURE is a schematic flow diagram of an exemplary brine processing operation having zones for removing platinum and other metals in accordance with the invention.

DETAILED DESCRIPTION OF THE INVENTION

In the present invention, platinum is removed from a brine by contacting the brine, preferably under turbulent flow conditions, with carbon Exemplary types of carbon include, but are not limited to, graphite, coal, coke, carbon black, charcoal, and activated carbon. The preferred types of carbon are graphite and activated carbon, with activated carbon being the most preferred.

The particle size and shape or configuration of the carbon is preferably selected to maximize the contact between the brine and the carbon without unduly impeding the flow of the brine through a carbon-containing bed or zone, i.e., without an undue pressure drop. Preferably, the carbon has a particle size sufficient to be retained on a 2.38 mm (No. 8) sieve, more preferably on a 2.83 mm (No. 7) sieve, even more preferably on a 3.36 mm (No. 6) sieve, and most preferably on a 4.00 mm (No. 5) or larger sieve. Typically, the particle size of the carbon is small enough to pass through a 50.8 mm (2 inch), and more commonly a 25.4 mm (1 inch), sieve.

Because the amount of platinum deposited from the brine onto the carbon increases as the pH of the brine decreases (all other parameters being held constant), the pH of the brine contacting the carbon is preferably less than about 5.5, and more preferably about 5 or less. Nevertheless, since brine corrosion increases with decreasing pH, it is also preferred that the pH of the brine be at least about 4, and more preferably at least about 4.5. Accordingly, the pH of the brine is desirably between about 4.5 and about 5, e.g., about 4.6, about 4.7, about 4.8, and about 4.9.

If necessary, the pH of the brine is lowered using an inorganic and/or organic acid. Exemplary inorganic acids include, but are not limited to, hydrochloric, nitric, sulfuric, and perchloric acids, and common organic acids include, but are not limited to, benzoic, formic, acetic, itaconic, chloroacetic, peracetic, trichloroacetic, citric, oxalic, and maleic acids. Hydrochloric acid is the preferred acid used with geothermal brines, while sulfuric acid is preferably used with non-geothermal aqueous solutions or brines.

The platinum deposited on the carbon is recovered by contacting the platinum scale-coated carbon with aqua regia to form a platinum-containing leachate. The platinum in the leachate is extracted by methods well known to those skilled in the art. See, for example, McGraw-Hill Encyclopedia of Science and Technology, McGraw-Hill, Inc., New York, N.Y. (1977), pages 478–480, the foregoing publication being incorporated by reference in its entirety. The cleaned carbon is then washed and returned to service.

The aqueous solutions treated by the process of the present invention preferably have a pretreated platinum concentration of at least about 0.1, more preferably at least about 0.2, even more preferably at least about 0.5, and most preferably at least about 1, parts per billion by weight (ppbw). Typically, the aqueous solutions treated by the process of the present invention have an initial platinum concentration of less than about 20, more commonly less than about 10, and usually less than about 5, ppbw.

The percentage of platinum recoverable from an aqueous solution tends to be affected by complexity of the solution being treated. When all other parameters are held constant, as the concentration of non-platinum materials in the aqueous solution increases, the percentage of platinum recoverable from the solution decreases. Typically, at least about 1, preferably at least about 5, more preferably at least about 10, even more preferably at least about 25, and most preferably at least about 50 or more, weight percent of the platinum present in an aqueous solution is recoverable using the process of the present invention. While the process of the present invention can theoretically recover substantially all of the platinum initially present in the platinum-containing aqueous solution, typically the process recovers less than about 99, more commonly less than about 95, and generally less than about 90, weight percent of the platinum present in the pretreated solution.

An unexpected aspect of the present invention is that activated carbon, as shown below in Table II, recovers a higher percentage of platinum from an aqueous solution, such as geothermal brine, than materials, e.g., iron, zinc, and aluminum, having higher oxidation potentials.

The platinum recovery process of the present invention is optionally employed in conjunction with one or more additional processes for recovering other precious (e.g., palladium, gold, and silver), as well as semiprecious (e.g., copper), metals from brine, such as the processes taught in the above-referred to U.S. Pat. No. 5,082,492, U.S. Pat. No. 5,145,515, and U.S. Pat. No. 5,145 656. For example with reference to the sole FIGURE, a geothermal brine recovery and processing system 10 embodying features of the present invention is schematically shown. In the geothermal system 10, brine is produced from a geothermal well 12. The geothermal brine is typically produced at a pressure of about 350 to about 400 pounds per square inch gauge (psig) and a temperature of about 350° to about 600° F.

Upon exiting the geothermal well 12, the produced geothermal brine is conducted by a conduit 14 to a zone 20 for removing silver from the geothermal brine, e.g., by the process of the above-incorporated U.S. Pat. No. 5,145,656. During transit to the silver-removal zone 20, an acid is optionally added through an injector 16 to the brine in the conduit 14. The amount and types of acid added to the brine are as discussed above with respect to recovering platinum from the brine.

To minimize the increased corrosion of ferrous metals that tends to occur upon the addition of even small amounts of acid, a reducing agent is also optionally added through an injector 18 to the brine in the conduit 14. The amount of reducing agent added is preferably slightly greater than that stoichiometrically required to reduce any trivalent iron and trivalent manganese cations contained in the brine to divalent cations. As described in U.S. Pat. No. 4,765,888, which patent is also incorporated herein by reference in its entirety, the reducing agent decreases scale formation by reducing the concentration of trivalent iron and manganese cations in the brine.

The silver-removal zone 20 preferably contains zinc. The zinc particle size, as well as the particle size of the other precious- and semiprecious-metal removing compositions discussed below, is within the particle size range discussed above with respect to carbon. Devices for containing zinc in the silver-removal zone 20 (and for confining the other precious-and semiprecious-metal removing compositions, including carbon, in their respective zones) are well known to those skilled in the art. A preferred containment apparatus is described in the above-referred to U.S. Pat. No. 5,145,656.

It is preferred that the residence time of the brine in the silver-removal zone 20, as well as in each of the subsequent precious- and semiprecious-metal removal zones, be as long as possible while maintaining turbulent flow. Generally, the residence time is greater than about 1 minute and preferably at least about 2 minutes. Typically, the residence time is less than about 15, more commonly less than about 10, and quite often less than about 5 minutes.

Upon leaving the silver-removal zone 20, the brine travels through a conduit 22 to a zone 24 for removing gold. Aluminum is the preferred metal present in the gold-removal zone 24. The effluent from the gold-removal zone 24 moves through a conduit 26 to a geothermal energy extraction plant or zone 28 where the latent heat in the brine is converted to steam or other useful forms of energy.

As the brine is processed in the geothermal energy extraction zone 28, the pH of the brine tends to increase. Accordingly, acid is optionally added to the effluent brine in a conduit 40 exiting the geothermal energy extraction zone 28 through an injector 44. The amount and type of acid added to the brine in the conduit 40 are as discussed above with respect to recovering platinum from the brine as well as regarding the acid added through the injector 16.

The brine effluent from the geothermal energy extraction zone 28 is carried by the conduit 40 to a zone 42 for removing copper. The metal present in the copper-removal zone 42 is preferably iron, steel, or zinc galvanized forms of such metals.

As shown in the FIGURE, the effluent from the copper-removal zone 42 is forced through a conduit 46 to a supplemental silver-removal zone 48 which also preferably contains zinc. The brine leaving the supplemental silver-removal zone 48 is conducted by a conduit 50 to a supplemental gold-removal zone 52 where the brine preferably again is brought in turbulent contact with aluminum. Upon exiting the supplemental gold-removal zone 52, the brine traverses a conduit 54 and enters a zone 56 for removing platinum. As detailed above, in the platinum-removal zone 56, platinum is removed from the brine by carbon. The effluent from the platinum-removal zone 56 is discharged via a conduit 58 to an injection well 60 for return to a subterranean formation.

The scale collected on the metals in the various metal-removal zones 20, 24, 42, 48, 52, and 56, is periodically removed to prevent excessive pressure drops across or even total plugging of one or more of the metal-removal zones 20, 24, 42, 48, 52, and 56. Methods for removing the scale from the various metals present in the metal-removal zones 20, 24, 42, 48, and 52 and for reclaiming the precious and semiprecious metal present in the removed scale are well known to those skilled in the art. See, for example, above-noted U.S. Pat. No. 5,082,492, U.S. Pat. No. 5,145,515, and U.S. Pat. No. 5,145,656. In addition, methods for removing the scale from the carbon present in the platinum-removal zone 56 and for reclaiming the platinum present in the removed scale are discussed above.

To remove the accumulated scale from the metals present in the metal-removal zones 20, 24, 42, 48, 52, and 56, the brine is rerouted to a parallel series of metal-removal zones. For example, when the scale collected on the zinc and/or aluminum in the silver-removal zone 20 and the gold-removal zone 24, respectively, is to be removed, the brine is rerouted by a conduit 30 to a parallel silver-removal zone 32, then by a conduit to a parallel gold-removal zone 36, and returned to the geothermal energy extraction zone 28 by a recycle conduit 38 that feeds into the geothermal zone influent conduit 26. Similarly, to remove the scale collected on one or more of the metals present in the copper-, supplemental silver-, supplemental gold-, and platinum-removal zones 42, 48, 52, and 56, respectively, the brine is rerouted by a conduit 66 to a parallel copper-removal zone 68, then by a conduit 70 to a parallel supplemental silver-removal zone 72, next by a conduit 74 to a parallel supplemental gold-removal zone 76, and then by a conduit 70 to a parallel platinum-removal zone 80. Finally, the rerouted brine is returned, by a conduit 82, to the discharge conduit 58 for injection into the well 60.

EXAMPLES

The following comparative examples demonstrate the removal from brine of platinum and other metals at or below copper in the electromotive series by carbon and various metals higher than copper in the electromotive series. These examples are intended to illustrate, and not limit, the invention.

EXAMPLES 1-11

Apparatus And Basic Methodology

A pilot plant test apparatus was operated by taking about 20 gallons per minute (gpm) of clarifier overflow brine having a temperature of about 220° F. and a pressure of about 100 psig. The brine, which contained a total of about 251,000 parts per million by weight (ppmw) of various dissolved elements, consisted, in part, of the materials set forth in the following Table A.

TABLE A

| Brine Constituents | |
|---|---|
| Constituent | Concentration, ppmw |
| Aluminum | < ~0.3 |
| Silver | ~1 |
| Antimony | ~1 |
| Arsenic | ~12.8 |
| Boron | ~319 |
| Barium | ~1,070 |
| Bromine | ~103 |
| Cadmium | ~1.2 |
| Calcium | ~25,000 |
| Chlorine | ~149,000 |
| Chromium | ~0.06 |
| Cesium | ~12 |
| Copper | ~5.2 |
| Fluorine | ~0.4 |
| Iron | ~459 |
| Iodine | ~5 |
| Potassium | ~13,500 |
| Lithium | ~1,770 |
| Magnesium | ~49 |
| Manganese | ~793 |
| Sodium | ~50,000 |
| Nickel | < ~0.1 |
| Lead | ~81 |
| Rubidium | ~73 |
| Selenium | < ~1 |
| Silicon | ~200 |
| Strontium | ~400 |
| Zinc | ~302 |
| Gold | ~0.02 |

TABLE A-continued

| Brine Constituents | |
|---|---|
| Constituent | Concentration, ppmw |
| Platinum | ~0.0002 |
| Palladium | ~0.0002 |

During each test, the brine sequentially was passed through a two-inch diameter conduit which contained an upstream corrosion/scale inspection spool, a two-inch diameter conduit having a portal for injecting an acid, and a static mixer. The static mixer was a 12-inch long section of a two-inch diameter conduit housing a helix formed of stainless steel through which the fluid was forced as it moved along the static mixer conduit to provide the turbulence needed to thoroughly mix the acid into the brine. The pH of the brine was measured above and below the static mixer.

Upon leaving the static mixer, the brine entered a three-inch diameter collection spool packed with a carbon or a metal higher in the electromotive series than silver for a distance of about 24 inches. After passing through the collection spool, the brine was (in some tests) filtered through a cartridge filter and then exited the system at a pressure of about 100 psig and a temperature of about 200° F. after passing through a two-inch diameter downstream corrosion/scale inspection spool. The upstream and downstream corrosion/scaling spools were sections of the conduit which held conventional carbon steel corrosion strips to monitor the corrosiveness of brine upstream and downstream of the acid injection point. The downstream corrosion/scale spool was of a length sufficient to provide a total residence time of about 1 minute for the brine flowing through the test apparatus.

When the brine was acidified, sufficient concentrated hydrochloric acid was added to achieve and maintain a concentration of about 20 ppm Hcl, which was sufficient to lower the pH to about 5.

At the conclusion of each run (which lasted up to about 120 hours), the packings were removed and inspected. The scale was scraped off the substrates and analyzed by inductively-coupled plasma/mass spectrometry (ICP-MS). The results are discussed below and summarized in the following Table I. In addition, the percent of platinum recovered by the different materials used as the collection spool, with and without the addition of acid, is listed in Table II, infra.

TABLE I

| | Metal Recovery Example | | | | | | | | | | |
|---|---|---|---|---|---|---|---|---|---|---|---|
| Metal | 1 $G^1 + A^2$ | 2 G | 3 $C^3 + A$ | 4 C | 5 Al + A | 6 Al | 7 Ti + A | 8 Ti | 9 Zn + A | 10 Zn | 11 $FF^4$ |
| Ag | | | | | | | | | | | |
| tr. oz/ton[5] | 88 | 58 | 88 | 58 | 88 | 88 | 175 | 234 | 234 | 175 | 58 |
| oz/mmlb[6] | 0.028 | 0.009 | 0.042 | 0.035 | 0.11 | 0.092 | 0.031 | 0.074 | 0.14 | 0.13 | 0.002 |
| Au | | | | | | | | | | | |
| tr. oz/ton | $2.9 \times 10^{-3}$ | $2.9 \times 10^{-3}$ | $2.9 \times 10^{-3}$ | $2.9 \times 10^{-3}$ | $6.0 \times 10^{-3}$ | $6.0 \times 10^{-3}$ | $8.8 \times 10^{-3}$ | $\sim 9.0 \times 10^{-4}$ | $\sim 6.0 \times 10^{-6}$ | $\sim 6.0 \times 10^{-3}$ | $2.9 \times 10^{-3}$ |
| oz/mmlb | $9.2 \times 10^{-7}$ | $4.5 \times 10^{-7}$ | $1.4 \times 10^{-6}$ | $1.8 \times 10^{-6}$ | $7.3 \times 10^{-6}$ | $\sim 3.0 \times 10^{-7}$ | $1.6 \times 10^{-6}$ | $\sim 3.0 \times 10^{-7}$ | $\sim 4.0 \times 10^{-6}$ | $\sim 4.0 \times 10^{-6}$ | $1.1 \times 10^{-7}$ |
| Pd | | | | | | | | | | | |
| tr. oz/ton | $\sim 3.0 \times 10^{-3}$ | $\sim 1.5 \times 10^{-3}$ | $\sim 1.8 \times 10^{-3}$ | $\sim 6.0 \times 10^{-3}$ | $\sim 6.0 \times 10^{-3}$ | $\sim 6.0 \times 10^{-3}$ | $5.8 \times 10^{-3}$ | $\sim 0.015$ | $\sim 3.0 \times 10^{-2}$ | $\sim 6.0 \times 10^{-3}$ | $\sim 6.0 \times 10^{-4}$ |
| oz/mmlb | $\sim 9.0 \times 10^{-6}$ | $\sim 2.2 \times 10^{-7}$ | $\sim 8.5 \times 10^{-7}$ | $\sim 3.5 \times 10^{-6}$ | $\sim 7.0 \times 10^{-6}$ | $\sim 3.0 \times 10^{-7}$ | $1.0 \times 10^{-6}$ | $\sim 4.6 \times 10^{-6}$ | $\sim 2.0 \times 10^{-5}$ | $\sim 4.0 \times 10^{-6}$ | $\sim 2.0 \times 10^{-7}$ |
| Pt | | | | | | | | | | | |
| tr. oz/ton | 0.058 | 0.099 | 0.099 | $\sim 6.0 \times 10^{-3}$ | $\sim 6.0 \times 10^{-4}$ | $\sim 6.0 \times 10^{-3}$ | $8.8 \times 10^{-3}$ | $\sim 3.0 \times 10^{-3}$ | $\sim 3.0 \times 10^{-2}$ | $\sim 6.0 \times 10^{-3}$ | 0.015 |

TABLE I-continued

| | Metal Recovery Example | | | | | | | | | | |
|---|---|---|---|---|---|---|---|---|---|---|---|
| Metal | 1 G[1]+A[2] | 2 G | 3 C[3]+A | 4 C | 5 Al+A | 6 Al | 7 Ti+A | 8 Ti | 9 Zn+A | 10 Zn | 11 FF[4] |
| oz/mmlb | $1.8 \times 10^{-5}$ | $1.5 \times 10^{-5}$ | $4.8 \times 10^{-5}$ | $\sim 3.5 \times 10^{-6}$ | $\sim 7.0 \times 10^{-7}$ | $\sim 3.0 \times 10^{-7}$ | $1.6 \times 10^{-6}$ | $\sim 9.0 \times 10^{-7}$ | $\sim 2.0 \times 10^{-5}$ | $\sim 4.0 \times 10^{-5}$ | $5.4 \times 10^{-7}$ |
| Cu | | | | | | | | | | | |
| tr. oz/ton | 2365 | 1110 | 1372 | 613 | 1723 | 2511 | 2891 | 2745 | 1927 | 3504 | 1781 |
| oz/mmlb | 0.75 | 0.17 | 0.66 | 0.37 | 2.16 | 2.64 | 0.52 | 0.87 | 1.2 | 2.6 | 0.065 |

[1] G denotes graphite.
[2] A denotes acid.
[3] C denotes activated carbon.
[4] FF denotes a water conditioner marketed by Freflo Water Systems, Inc.
[5] tr. oz/ton denotes troy ounces of metal recovered per ton of deposited scale.
[6] oz/mmlb denotes ounces of metal recovered per million pounds of geothermal brine treated.

DISCUSSION

In Examples 1-2, the brine was passed through collection spools consisting of graphite rods encoiled in galvanized poultry wire. In Example 2, the brine was not acidified, whereas in Example 1, the brine was acidified with about 20 ppm hydrochloric acid, resulting in about a 0.3 unit decrease in pH (i.e., from about 5.3 to about 5). More scale was deposited in the collection spool when the brine was acidified than when the brine was not acidified. In both Examples 1-2, more scale was deposited in the downstream inspection spool than in the upstream inspection spool.

Regarding Examples 3-4, in these tests, the brine was passed through collection spools packed with a bed of activated charcoal pellets having a particle size within the range of about 2.38 mm (No. 8) to about 3.36 (No. 6) mm sieve. During Example 4, solids in the nonacidified brine plugged the inlet of the collection spool. While performing Example 3, a similar situation occurred with the acidified brine, but the charcoal bed did not completely plug. Additionally, the beds became cemented with solids (e.g., silica, barite, and fluorite). More scale deposited in the unacidified than the acidified test. The highest platinum recovery occurred using activated carbon in conjunction with acidified brine (Example 3).

Brine was flowed through collection spools composed of encoiled poultry wire packed with aluminum rods in Examples 5-6. More scale was deposited in the collection spool when the brine was acidified (Example 5) than when the brine was not acidified (Example 6). The highest gold recovery (about $7.3 \times 10^{-6}$ tr.oz/mmbl) was obtained in Example 5. Scaling downstream of the collection spools was greater than that observed upstream of the collection spools in Examples 5-6.

In Examples 7-8, brine was flowed through collection spools composed of packed beds of 2.38 (No. 8) mm titanium sponge. Neither Example 7 nor 8 collected significant amounts of scale, but more scale was collected with nonacidified brine than with acidified brine. Scaling was reduced across the collection spool by about 24 percent during Example 8, but doubled during Example 7.

In examples 9-10 the collection spools consisted of encoiled poultry wire packed with zinc rods. Significant quantities of scale were deposited in the collection spools. Silver recoveries were the highest in Examples 9-10, with slightly more silver being recovered from the acidified brine of Example 9 than the unacidified brine of Example 10. Downstream scaling rates in Examples 9-10 were nearly the same as the upstream rates, despite the removal of significant scale in the collection spools.

In Example 11, unacidified brine was passed through a collection spool composed of a water conditioner marketed by Freflo Water Systems, Inc. The conditioner consisted of an alloy monolith housed in a copper body. The conditioner had little effect on the overall downstream scaling, but did reduce fluorite scaling by about 31 percent and increased lead scaling by about 238 percent.

Although the present invention has been described in considerable detail with reference to some preferred versions, other versions are possible. For example, in addition to removing precious and semiprecious metals from geothermal brines, the method and system of the invention can also be used to remove such metals from brine produced during oil and gas recovery operation, other sources of brine, as well as metal-containing solutions such as those generated during mining operations. Hence, not all versions of the system of the present invention need contain a geothermal energy extraction zone. In addition, not all the metal removal zones shown in the sole FIGURE need be used and the sequential order of such metal-removal zones can be changed. Also, instead of rerouting the brine through an entire parallel series of metal-removal zones, when a particular metal-removal zone is to be shut down, the brine can be simply rerouted through a sole parallel metal-removal zone. Therefore, the spirit and scope of the appended claims should not necessarily be limited to the description of the preferred versions contained herein.

What is claimed is:

1. A method for removing platinum from a platinum-containing brine comprising the step of contacting the brine with carbon.

2. The method of claim 1 wherein the carbon is selected from the group consisting of graphite, coal, coke, carbon black, charcoal, activated carbon, and mixtures thereof.

3. The method of claim 1 wherein the carbon comprises graphite.

4. The method of claim 1 wherein the carbon comprises activated carbon.

5. The method of claim 1 wherein the brine is at an elevated temperature.

6. The method of claim 1 wherein the brine is at an elevated pressure.

7. The method of claim 1 wherein the brine has a pH below about 5.5.

8. The method of claim 1 wherein the brine is at an elevated temperature and pressure and has a pH below about 5.5.

9. A method for removing platinum and at least one additional metal selected from the group consisting of copper and metals below copper in the electromotive series from a metal-containing brine comprising the steps of:
- (a) contacting the brine with at least one metal higher in the electromotive series than copper; and
- (b) contacting the brine with carbon.

10. The method of claim 9 wherein step (a) is performed prior to step (b).

11. The method of claim 9 wherein step (a) comprises the step of contacting the brine with iron and step (a) is performed before step (b).

12. The method of claim 9 wherein step (a) comprises the step of contacting the brine with zinc and step (a) is performed before step (b).

13. The method of claim 9 wherein step (a) comprises the step of contacting the brine with aluminum and step (a) is performed before step (b).

14. The method of claim 9 wherein step (a) comprises the sequential steps of:
- (c) contacting the brine with iron;
- (d) contacting the brine with zinc; and
- (e) contacting the brine with aluminum; wherein steps (c)–(e) are performed before step (b).

15. A method of removing metal from a geothermal brine comprising the sequential steps of:
- (a) producing brine having an elevated temperature and pressure from a subterranean formation;
- (b) passing the produced brine through a flashing means for flashing the brine to a lower pressure to release steam; and
- (c) contacting the flashed brine with carbon.

16. The method of claim 15 further comprising the step (d) of contacting the produced brine with at least one metal selected from the group consisting of aluminum and zinc for removing at least some metal selected from the group consisting of silver and gold from the brine, wherein step (d) is performed after step (a) and before step (b).

17. The method of claim 15 further comprising the steps of:
- (d) contacting the produced brine with at least one metal selected from the group consisting of aluminum and zinc for removing at least some metal selected from the group consisting of silver and gold from the brine; and
- (e) adding acid to the flashed brine to lower the flashed brine pH to less than about 5.5, wherein step (d) is performed after step (a) and before step (b), and step (e) is performed after step (b) and before step (c).

18. A system for removing platinum from a platinum-containing geothermal brine, the system comprising:
- (a) means for producing the geothermal brine from a subterranean formation;
- (b) means for flashing the produced geothermal brine to a lower pressure to release steam;
- (c) means for transporting the produced geothermal brine from the brine production means to the brine flashing means;
- (d) means for contacting the geothermal brine with carbon;
- (e) carbon particles present in the carbon-contacting means; and
- (f) means for transporting the flashed geothermal brine to the carbon-contacting means.

19. The system of claim 18 wherein the system further comprises the flashed geothermal brine, the flashed geothermal brine having a pH less than about 5.5 and being in contact with the carbon in the carbon-contacting means.

20. The method of claim 19 wherein the flashed geothermal brine transporting means comprises:
- (i) means for contacting the flashed brine with at least one metal higher in the electromotive series than copper, the additional metal-contacting means having at least one metal higher in the electromotive series than copper present therein;
- (ii) means for transporting the flashed brine to the metal-contacting means; and
- (iii) means for transporting the metal-contacted brine to the carbon-contacting means.

21. The method of claim 1 wherein the brine has a pH of about 4 to less than about 5.5.

22. The method of claim 1 wherein the brine has a pH of about 4.5 to about 5.

* * * * *